United States Patent Office — 3,737,551 — Patented June 5, 1973

3,737,551
WETTABLE AND DISPERSIBLE POWDERS
Kenneth S. Karsten, Westport, and Charles Edward Bradley, Jr., Weston, Conn., assignors to R. T. Vanderbilt Company, Inc., New York, N.Y.
No Drawing. Continuation-in-part of application Ser. No. 717,368, Mar. 29, 1968, which is a continuation-in-part of application 628,277, Apr. 4, 1967. This application Aug. 20, 1969, Ser. No. 851,738
Int. Cl. A01n 9/12, 9/20, 9/22
U.S. Cl. 424—286         6 Claims

ABSTRACT OF THE DISCLOSURE

A wettable and dispersible powder of a water-insoluble solid is produced by admixing a moist cake of the solid with a dispersing agent and a wetting agent to produce a pumpable slurry of finely divided solid in water, and thereafter drying the slurry. The dried product, when added to water, rapidly forms dispersion of finely divided particles which can be stored with greatly reduced tendency toward settling and, if settling occurs after extended storage, can be redispersed easily with agitation. When drying is effected by spray drying there is obtained a free-flowing product composed of generally spherical agglomerates of the finely divided solid. The invention is of particular utility for providing very high assay wettable biocide powders which can be applied as a spray.

---

This application is a continuation-in-part of application Ser. No. 717,368 filed Mar. 29, 1968, now abandoned, which in turn is a continuation-in-part of application Ser. No. 628,277 filed Apr. 4, 1967, now abandoned.

This invention relates to wettable and dispersible powders and to methods for their manufacture.

There are numerous water-insoluble solid materials which are employed in the form of aqueous suspensions. To be useful in this fashion, the solid desirably is in a free-flowing, finely-divided, dust-free state; is wettable and dispersible in water; is able to remain in suspension for extended periods without settling; and if settling should occur, is easily redispersed.

In the past there have been few products which were completely satisfactory in all respects. Thus, the necessary size reduction is usually achieved by dry grinding, which yields a non-uniform product containing a high proportion of extremely fine particles or dust. Further, grinding cannot be used with some materials which are comparatively low melting or are pressure sensitive. Also, during grinding many materials accumulate static charges which cause the dry particles to clump together and interfere with the flowability of the powder.

To overcome this dry clumping tendency, diluents, for example, clays such as kaolin, and/or parting agents such as calcium silicate or silica, have been mixed with the solid to be dispersed. To be effective, these diluents normally are present in large amounts, usually at least about 20 to about 30 percent, based upon the solid being dispersed.

A second problem often encountered is that of wetting the powder upon addition to water. Many particulate, water-insoluble solids are hydrophobic in the sense that, when added to water, the particules are not wetted and thus do not sink. Rather they tend to clump together and remain on the surface of the water, even when subjected to vigorous agitation. To overcome this problem, the solids have been dry blended with certain surfactants which promote wetting, i.e., wetting agents.

Still another problem is that of wet clumping—the tendency of particles which have become wetted to clump together in the form of large agglomerates. This problem, which is aggravated by the presence of wetting agents, has been alleviated by the use of dispersing agents, i.e., surfactants which prevent wet clumping and retard settling of the suspended particles. The dispersing agent, like the wetting agent, normally was dry blended with the particulate solid.

Because of the presence of the diluent, parting agent, wetting agent and dispersing agent, the functional solid rarely constituted more than about 75 weight percent of the wettable powder composition. By the term "functional solid" is meant the solid which is desired to be employed in aqueous suspension, and can include solids having specific chemical or physiological activity, such as biocides, as well as other solids which are desirably dispersed in aqueous media to achieve a specific result, such as pigments for water-based paints. This term is intended to exclude, however, additives such as diluents, parting agents and wetting and dispersing agents which are employed to permit the formation of a wettable and dispersible powder containing the functional solid.

It is an object of this invention to provide a powder which is readily wettable by and dispersible in water.

It is a further object of this invention to provide a free-flowing, dust-free, finely divided, wettable and dispersible powder.

Still a further object of this invention is to provide a free-flowing, wettable powder which does not require a diluent and/or parting agent to prevent dry clumping.

A still further object of this invention is to provide a wettable and dispersible powder which contins considerably higher content of functional insoluble solids than heretofore possible.

These and other objects of this invention, which will be apparent from the ensuing specification and claims, are achieved by admixing a wet particulate solid with a dispersing agent and a wetting agent to provide a fluid slurry of the solid in water and thereafter drying the slurry.

The dispersing and wetting agents can be added to the wet solid simultaneously or sequentially, provided that the wetting agent is added no earlier than the dispersing agent. If the wetting agent is added first, the solid particles "clump" together and prevent the formation of the products of this invention. Because there is a possibility that the wetting agent may accidentally predominate during simultaneous addition, it is preferred that the dispersing agent be admixed with the wet particulate solid to form a pumpable slurry, and the wetting agent be added to the resulting slurry.

The water content of the initial wet particulate solid is not narrowly critical to the operability of the process of this invention. There are, however, certain practical considerations. For example, the water content should be low enough to permit drying of the final product in an economically feasible manner. Thus, water contents in excess of about 70 weight percent are to be avoided. Wet particulate solids of this character, i.e., at least about 30 percent solids, are ordinarily in the form of a moist cake, such as is obtained upon filtering a solid from suspension in an aqueous medium. The solids contents of such filter cakes can be as high as about 60 or 70 percent when the solid is recovered by centrifuging. Such high solids contents are usually undesirable because a pumpable slurry cannot be formed in the second step without the addition of water. Accordingly, the solids content of the cake is generally below about 55 percent, and preferably below about 50 percent.

The size of the particles composing the wet solid is not narrowly critical to the present invention, and will depend upon the size desired in the final product. In general, to achieve stable suspensions, particle sizes of less than about 20 microns are normally required, with particle sizes of below about 10 microns being preferred. When a wettable pesticide of this invention is applied by spraying, particle sizes between about 5 microns and about 0.1 micron ordinarily are desired.

The wet particulate solid can be obtained in any suitable fashion, as by slurrying a particulate solid with water, wet grinding of the solid and the like. A preferred procedure for preparing particularly fine particles is to precipitate the solids from water, as by means of a reaction between aqueous solutions of reactants or by adding water to a solution of the functional solid in an organic solvent followed by removal of the solvent by evaporation or decantation. The precipitated solids are desirably filtered immediately to prevent undesirable particle growth. When there are undesirable foreign materials dissolved in the aqueous medium the filter cake is washed with water.

The dispersing agents which are added to the wet solids in practicing this invention are employed for two functions. First, when the wet particulate solid is a filter cake, they must convert the cake to a pumpable slurry. Secondly, they must maintain a dispersion of the particles when the dry product of this invention is admixed with water. Unlike the processes described in the prior art, only a limited number of products which have been marketed as dispersing agents have been found useful to satisfy both of these functions. The agents include the alkali metal salts of naphthalene sulfonic acid-formaldehyde condensates, such as the sodium naphthalene sulfonic acid-formaldehyde condensates marketed by R. T. Vanderbilt Company, Inc. under the trade name Darvan No. 1, and alkali metal and alkaline earth metal lignosulfates, such as sodium lignosulfate (Darvan No. 2) and calcium lignosulfonate (Darvan No. 4). Alkali metal derivatives, especially those of sodium and potassium, are preferred.

The amount of dispersing agent required is that sufficient to aid in dispersing the powder product of this invention in water and, when the wet particulate solid is in the form of a wet cake, sufficient to yield a pumpable slurry. Normally, suitable amounts will be at least about 0.5 percent, based upon the weight of the solid. Greater amounts of dispersing agent are required as the solids content of the wet cake increases. However, if the cake cannot be slurried upon the addition of more than about 2.5 percent or more dispersing agent, additional water should be added. The dispersing agent can be added in amounts of about 5 percent, or even higher, but amounts in excess of 5 percent are unnecessary to provide the wettable, dispersible powders of this invention, and thus are uneconomical. Amounts of about 1 percent, e.g., 0.8 to about 1.2 percent, are preferred.

The dispersing agent is mixed into the wet solid in any convenient manner. For example, the dispersing agent is mulled into a wet filter cake and agitation is continued until a pumpable slurry free from lumps is obtained.

In the second step of the preferred process of this invention, a wetting agent is added to the slurry. Contrary to the teachings of the prior art, a limited number of wetting agents can be employed. Suitable wetting agents are those which aid in wetting the powder product of this invention, are compatible with the dispersing agents employed in the first step and do not cause undue thickening or foaming of the slurry.

Wetting agents which have been found suitable for use with the previously disclosed dispersing agents are those falling within classes I/G$_1$, I/K, I/O$_{42}$, I/P and III/C of J. P. Sisley and P. J. Wood, Encyclopedia of Surface-Active Agents, Chemical Publishing Co., Inc., New York, Vol. I (1961) and Vol. II (1964).

Class I/G$_1$ comprises the alkali metal salts of condensation products of a fatty acid chloride and an aminosulfonic acid. A preferred class comprises the N-higher acyl-N-lower alkyl taurates, wherein "higher acyl" embraces acyl groups of from about 8 to 18 carbons and lower alkyl embraces alkyl groups of from about 1 to about 3 carbons, especially methyl. Particularly preferred are the taurate derivatives wherein the higher acyl group is derived from coconut fatty acids, such as sodium N-cocoyl-N-methyltaurate (Igepon TC–42 by General Aniline & Film Corp).

Class I/K comprises alkali metal salts of fatty alkyl and alkenyl sulfonates and sulfates wherein fatty alkyl and alkenyl includes alkyl and alkenyl groups of from about 8 to 18 carbons. Illustrative members of this class include alkali metal alkyl and alkenyl sulfonates such as sodium tetradecyl sulfonate marketed by Union Carbide Corp. under the tradename Tergitol No. 4, and sodium octadecenyl sulfonate marketed by E. I du Pont de Nemours & Co. under the tradename Aquarex MDL, alkali metal alkyl sulfates such as sodium lauryl sulfate marketed by Millmaster Onyx Chemical Co. under the tradename Maprofix LK and a mixed sodium lauryl and myristyl sulfate marketed by Du Pont under the tradename Aquarex D.

Class I/O$_{42}$ comprises alkali metal alkylbenzene sulfonates having at least 10 carbons in the alkyl group thereof. Preferred members of this class include those having from 10 to about 18 carbons in the alkyl group, and include sodium dodecylbenzene sulfonate marketed by Atlantic Refining Co. under the tradename Ultrawet K.

Class III/C comprises ethoxylated alkyl phenols having from about 8 to about 15, preferably from about 8 to about 10, carbons in the alkyl group and about 4 to about 20 oxyethylene units. Preferred members of this class are the octylphenol ethoxylates such as those having about 5 ethyleneoxy units and about 8 to about 10 ethyleneoxy units, marketed by Rohm & Haas Co. under the tradename units, marketed by Rohm & Haas Co. under the tradenames Triton X–45 and X–100, respectively.

Class I/P comprises the alkali metal salts of the sulfonated derivatives of Class III/C. Illustrative of this class is sodium alkyl phenyl polyether sulfate (Triton 770 of Rohm & Haas Co.).

The wetting agent is added in an amount sufficient to aid wetting of the dry product of this invention. Ordinarily at least about 0.05 weight percent, based upon the weight of solids, is required. Amounts in excess of about 2.0 percent should be avoided because of the tendency of such large amounts to thicken the slurry and/or to promote excessive foaming. Amounts of from about 0.15 to about 0.3 are preferred.

The wetting agent is carefully stirred into the slurry to avoid incorporating air into the mixture or otherwise causing foaming.

The final step of the process of this invention comprises drying the slurry, as by various known techniques including drum drying, oven drying, spray drying and the like. Spray drying is preferred because it yields directly a uniform, finely divided powder, thus avoiding the need for a subsequent grinding step. When a free-flowing powder is desired, spray drying is particularly preferred because the spray-dried product comprises generally spherical agglomerates of solid particles. In addition, the spray-dried product has a substantially higher bulk density than products having similar compositions but which require grinding after drying.

When spray-drying is employed, the agglomerate size will depend upon the size of the particle present in the initial slurry (prior to addition of wetting agent) and the conditions of the spray drying. Desirably, the agglomerate size should range from about 1.5 to about 200 microns, with average sizes in the range of from about 25 to about 75 microns being preferred. The extent of drying is not narrowly critical, provided a free-flowing product is obtained. In general the moisture content should be below about 1%, with moisture contents of less than about 0.5% being preferred.

These agglomerates, unlike those of the prior art, can be added directly to water without the prior addition of energy, such as by grinding. The agglomerates are composed of particles having the size of the particles present in the slurry formed by addition of the dispersing agent, and when added to water, the agglomerates "explode" or disintegrate spontaneously, whereby the individual particles thereof are rapidly wetted and dispersed throughout the aqueous phase with little or no stirring of the suspension. This unique behavior is believed due to the intimate contact between the wetting and dispersing agents and the individual particles achieved by the process of this invention. In particular, it is believed that at least a portion of each of the wetting and dispersing agents is deposited on at least a portion of the surface of the solid particles. Because of the presence of the wetting agent and dispersing agent on the particle surface, these agents, when dissolved in the water, are already at the particle-water interface and immediately effect wetting and dispersion of the particle in the water. Wettable powders prepared by the conventional dry-blending techniques, on the other hand, comprise a physical mixture of discrete particles of wetting agent, dispersing agent and solid. In this case, the wetting and dispersing agents must dissolve and the distributed throughout the aqueous phase before good wetting and dispersion of the solids can be achieved.

The process of this invention can be employed to provide wettable powders of any water-insoluble functional solid, including mixtures of two or more such functional solids. Suitable functional solids include pigments for water-based paints, biocides of various types, including insecticides, rodenticides, nematocides, fungicides, bactericides, herbicides, amphibian and reptile poisons or repellants, bird poisons or repellants, invertebrate poisons or repellants, plant regulators, plant defoliants, plant desiccants and the like.

The present invention is particularly applicable for producing wettable and dispersible powders of organic or metallo-organic biocides such as manganese dimethyldithiocarbamate (known commercially as Niacide M), zinc ethylene-bis(dithiocarbamate) (zineb), manganese ethylene-bis(dithiocarbamate) (maneb), ferric (dimethyldithiocarbamate) (ferbam), tetramethylthiuram disulfide (thiram), 1,1,1 - trichloro-2,2-bis(p-chlorophenyl)ethane (DDT), a 2 - (alpha-acetonylbenzyl)-4-hydroxycoumarin (warfarin), 3,5 - dimethyltetrahydro-1,3,5,2H-thiadiazine-2-thione (mylone), zinc salt of 2 - pyridinethiol-1-oxide (Vancide ZP), hexachlorophene, 2,2' - thiobis(4,6-dichlorophenol) (bithionol), pentachlorophenol, 2,4-dichlorophenoxyacetic acid (2,4-D), 2,4,5-trichlorophenoxy-acetic acid (2,4,5-T), and rotenone.

The method of the present invention permits the production of a free-flowing, wettable and dispersible powder having extremely high content of functional solid, e.g., from about 93 to over about 99 weight percent. Functional solid contents of this magnitude ordinarily are not achieved, however, for technical grade functional solids are rarely free of contaminants. Nevertheless, when technical grade functional solids are employed, the content of active functional solid can be about 85 weight percent or more, and frequently can be as high as from about 90 to about 95 weight percent.

Products of this nature which are substantially free of inert diluents are of particular importance in the agricultural field, in which extensive use is made of aircraft to apply biocides in the form of aqueous sprays. Because the powder produced in accordance with this invention can contain substantially more active biocide than the prior art powders, the effective payload of the aircraft is increased. It also has been found that, because of the extremely fine size of the dispersed particles, plugging and erosion of spray nozzles are reduced.

Although the present invention is of particular importance because the diluents and/or parting agents of the prior art are not required, such materials may be present if desired in amounts up to about 50 weight percent based upon functional solid. If present, the product produced in accordance with this invention still is superior to products containing similar proportions of ingredients prepared by prior art techniques in respect to dispersibility, shelf life of the dispersion and/or redispersibility of the dispersion should settling occur. When such diluents or parting agents are employed they can be admixed with the functional solid at any time prior to drying. When such diluents are employed, the amounts of wetting agent and dispersing agent added during the process of this invention will be based upon total insoluble solids (functional solid plus diluent).

Aqueous biocide compositions can contain the powder of this invention in varying amounts, depending upon the mode of application, the particular biocide being employed, the amount of active solid in the powder and the specific area of use. In general, however, the powder is added to water at a rate of from about 0.75 pound per 100 gallons to 100 pounds per 100 gallons, although higher amounts can be employed if desired. Most commonly, the rate of addition will be in the range of from about 1 to about 5 pounds per 100 gallons.

The aqueous suspensions of the powders of this invention are characterized by a long storage life. Suspensions of conventionally prepared products settle quickly and frequently form a cake which can be redispersed only with difficulty, if at all. Those of this invention can be stored for periods of up to three days or even longer without significant settling, and the sediment which does form is easily redispersed with a minimum of agitation.

The reduced settling tendency of the products of this invention is illustrated by the data presented in Table I. These data were obtained by preparing suspensions of various biocides in water at a rate of 640–650 pounds per hundred gallons and allowing the suspensions to stand without agitation for three days. The viscosities of the suspensions were determined using a Brookfield viscosimeter and heliopath immediately after their formation and again at the end of the 3-day period. Sample A was a 95% active ferbam formulation produced in accordance with this invention and Sample B was a 76% active commercially-available ferbam. Samples C and D were 75% active thiram formulations produced in accordance with this invention and the prior art, respectively.

TABLE I.—VISCOSITY OF SUSPENSIONS

| | | | | | Vicosity, cps. | |
|---|---|---|---|---|---|---|
| Sample | Biocide | Percent active | Source | Amount of powder, lb./100 gal. | Initial | After 3 days storage |
| A | Ferbam | 95 | Invention | 650 | 744 | 1,120 |
| B | do | 76 | Commercial | 640 | 192 | 1,148,000 |
| C | Thram | 75 | Invention | 650 | 36 | 6,060 |
| D | do | 75 | Prior art | 650 | 4,760 | 20,000 |

In both cases, the products of the present invention (Samples A and C) were superior to those of the prior art (B and D). In particular, Sample B, which contained a large proportion of kaolin as parting agent and diluent, settled quickly and developed a hard cake, whereas Sample B, which contained a large proportion of kaolin as parting agent and diluent, settled quickly and developed a hard cake, whereas Sample A, which contained no kaolin, was readily redispersible despite its higher initial viscosity. A comparison of Samples C and D shows that the process of this invention yields a superior product even when the same ingredients are present as in the prior art products having the same active assay.

EXAMPLE I

Ferric (dimethyldithiocarbamate) wettable and dispersible powder

A filter cake of ferric dimethyldithiocarbamate synthesized by conventional methods (described in U.S. Pat. No. 2,492,314), weighing 244 pounds with 45% solids content, was placed in a 55-gallon open head steel drum and 4.4 pounds of a 25% aqueous solution of Darvan No. 1 (sodium naphthalene sulfonic acid-formaldehyde condensate) were added and mixed with the filter cake by stirring with a motor-driven propeller until the slurry was free from lumps and in a fluid condition. Triton X–100 (ethoxyalted octylphenol containing 8–10 moles of ethylene oxide), 2.75 pounds of 10% aqueous solution, was then added and the mixture was stirred with a motor-driven propeller, taking care to avoid beating air into the slurry. The slurry was pumped to a 4 foot-diameter Nichols spray drier equipped with a rotary atomizer and an inlet temperature 500° F. at a rate such that the outlet temperature was 180° F. The rate of production was 42 pounds per hour of dry product having a moisture content of less than 0.2%. The product so obtained assayed 95.2% ferric dimethyldithiocarbamate by the method of "Official Methods of Analysis of the Association of Official Agricultural Chemists," 10th edition, 1965, pages 73–74. The dry powder was easily flowable, and it was immediately wettable and dispersible in water with a minimum of agitation. When suspended in water, the particles had an average size of one micron.

EXAMPLE II

Tetramethylthiuram disulfide wettable powder

Tetramethylthiuram disulfide prepared by oxidation of sodium dimethyldithiocarbamate in aqueous solution by known methods was filtered, washed, and as much water as possible was removed by filtration. The wet filter cake, weighing 334 pounds and containing 45% solids, was placed in a 55-gallon open head steel drum and 6 pounds of a 25% aqeuous solution of Darvan No. 1 were added and blended with a high speed disc type intensive mixer (Cowles Dissolver). Then 3.75 pounds of a 10% aqueous solution of Triton X–100 were added and blended with a slow speed disc type intensive mixer, taking care to avoid beating in air and foaming. The slurry thus formed was pumped to a 7'6" diameter Nichols spray drier equipped with a rotary atomizer and having an inlet temperature of 660° F. at a rate such that the outlet temperature was 205° F. The rate of porduction was 126 pounds per hour of dry product having a moisture content of 0.1%. The product assayed 98.2% by the infrared spectrophotometric method at 1168.7μ, and it was immediately wettable and dispersible in water with a minimum of agitation.

EXAMPLE III

Oven dried tetramethylthiuram disulfide wettable and dispersible powder

Tetramethylthiuram disulfide prepared by known methods (see Example II) was filtered, washed and as much water as possible removed by filtration. A wet filter cake weighing 1201 grams and containing 66.6% solids was placed in the bowl of a vertical type dough mixer equipped with rotating eccentric paddles. Darvan No. 1, 21 grams of a 25% aqueous solution, was added to the wet filter cake and mixed to form a heavy paste. The paste was gradually thinned by incremental addition of 300 grams of water while stirring, then 20.0 grams of a 10% aqueous solution of Triton X–100 were stirred into the mixture. The resulting slurry was placed on trays and dried in an oven at 160° F. The dried product was crushed and ground to produce a dry powder which was readily wettable and dispersible in water with little or no agitation.

The procedure of Example III was modified in several ways in Example IV to X, either by substituting another dispersing agent for Darvan No. 1, another wetting agent for Triton X–100, or by using different methods of drying. The results of these experiments are summarized in Table II.

TABLE II.—TETRAMETHYLTHIURAM DISULFIDE WETTABLE AND DISPERSIBLE POWDER

| Example | Dispersing agent [1] | 800 grams solids; 733 grams total water Wetting agent [2] | Drying | Product |
| --- | --- | --- | --- | --- |
| III | Darvan No. 1 [3] | Triton X–100 [4] | Oven, 150° F | Readily wettable, dispersible free-flowing, fine particle size after grinding. |
| IV | Sodium lignosulfonate | do | do | Do. |
| V | Calcium lignosulfonate | do | do | Do. |
| VI | Darvan No. 1 | Triton X–45 [5] | do | Do. |
| VII | do | Triton 770 [6] | do | Do. |
| VIII | do | Igepon TC–42 [7] | do | Do. |
| IX | do | Aquarex MDL [8] | do | Do. |
| X | do | Triton X–100 | Drum, 80 p.s.i | Do. |

[1] 5 grams on the dry, or 100% active basis.
[2] 2 grams on the dry, or 100% active basis.
[3] Darvan No. 1=Sodium naphthalene sulfonic acid-formaldehyde condensate.
[4] Triton X–100=Ethoxylated octyl phenol containing 8-10 moles ethylene oxide.
[5] Triton X–45=Ethoxylated octyl phenol containing 5 moles ethylene oxide.
[6] Triton 770=Sodium alkyl aryl polyether sulfate.
[7] Igepon TC–42=Sodium N-coconut N-methyl taurate.
[8] Aquarex MDL=Octadecenyl sulfonate.

EXAMPLE XI

Ferric dimethyldithiocarbamate wettable and dispersible powder

To 200 pounds of wet filter cake containing 46% ferric dimethyldithiocarbamate solids and placed in an open head 55-gallon steel drum, were added 4 pounds of a 25% aqueous solution of Darvan No. 1. The resulting mixture was stirred with a motor-driven propeller until free from lumps and in a fluid condition. Powdered kaolin weighing 20.4 pounds was mixed in, with stirring, and then 2.5 pounds of a 10% aqueous solution of Triton X–100 were added and mixed in with the propeller, taking care to avoid beating air into the resulting slurry. The slurry so formed was pumped to a 4-foot diameter Nichols spray drier equipped with a rotary atomizer of speed 24,000 r.p.m., and having an inlet temperature of 500° F., at a rate such that the outlet temperature was 180° F. The rate of production was 45 pounds per hour of product having a moisture content of less than 0.2%. The dried product assayed 76.2% ferric dimethyldithiocarbamate. It was immediately wettable and dispersible in water with a minimum of agitation.

EXAMPLE XII

Manganese ethylenebisdithiocarbamate wettable and dispersible powder

Manganese ethylenebisdithiocarbamate was prepared according to conventional methods (see U.S. Pat. No.

2,504,404), and 19.2 pounds of the wet filter cake containing 71.2% solids were placed in a 5-gallon steel container. To the filter cake were added 0.55 pound of a 25% aqueous solution of Darvan No. 1 and 0.55 pound of a 25% aqueous solution of Darvan No. 2 (sodium lignosulfonate), distributing the solutions evenly over the surface of the powdery filter cake. While stirring with a motor-driven propeller, 26.0 pounds of water were added gradually and stirring was continued until the mixture was free from lumps and in a fluid condition. Then 0.34 pound of a 10% aqueous solution of Triton X-100 was mixed in with the propeller, taking care to avoid beating air into the resulting slurry. The slurry thus obtained was pumped to a 4-foot diameter Nichols spray drier equipped with a rotary atomizer and having an inlet temperature of 500° F. at a rate sufficient to maintain the outlet temperature at 180° F. The rate of production was 27 pounds per hour of dry product assayed 95% manganese ethylenebisdithiocarbamate by the carbon disulfide method, and it was found to be immediately wettable and readily dispersible in water with a minimum of agitation.

EXAMPLE XIII

Zinc ethylenebisdithiocarbamate wettable and dispersible powder

Zinc ethylenebisdithiocarbamate was prepared by conventional methods (see Example XII reference). A wet filter cake weighing 37 pounds and containing 38.7% solids was placed in a 5-gallon steel container and 0.71 pound of a 25% aqueous solution of Darvan No. 1 was added and mixed in with a motor-driven propeller. Stirring was continued until the mixture was free from lumps, then 0.26 pound of a 10% aqueous solution of Triton X-100 was stirred in, taking care to avoid beating air into the slurry. The slurry thus obtained was pumped to a 4-foot diameter Nichols spray drier equipped with a rotary atomizer and having an inlet temperature of 500° F. at a rate sufficient to maintain the outlet temperature of 180° F. The rate of production was 32 pounds per hour of dry product having a moisture content of 0.2%. The dried product assayed 23.5% zinc by the EDTA method corresponding to 99.1% zineb. It was found to be immediately wettable in water with a minimum of agitation.

EXAMPLE XIV 1,1,1-trichloro-2,2-bis(p-chlorophenyl)ethane

Two hundred grams of technical DDT, 200 grams of water, and 2 grams of Darvan No. 1, were placed in a one-quart capacity ball mill and were mixed and ground therein for twelve hours at approximately 60 r.p.m. Then 5 grams of a 10% aqueous solution of Triton X-100 was added and the ball mill rotated for two minutes longer. The mixture thus prepared was poured into a tray and dried for 16 hours in a 150° F. oven. The dried product was crushed to a fine powder, which was found to be wettable and dispersible in water.

EXAMPLE XV

Lead dimethyldithiocarbamate

To 215 parts of a wet, salt-free filter cake containing 46 weight percent lead dimethyldithiocarbamate was added 4 grams of 25 percent aqueous Darvan No. 1 and the mixture was stirred with a propeller type mixture until a pourable slurry was obtained. Then there was added 2.5 parts of 10 percent aqueous Ultrawet K (dodecylbenzene sodium sulfonate) and the slurry was carefully agitated to avoid foaming, and oven dried overnight at 160° F. The dried product was ground with mortar and pestle to yield a powdered product which rewet easily and redispersed readily in water.

A sample of a 96% zinc dimethyldithiocarbamate product produced in a manner similar to the process described in Example I was deposited without agitation on the surface of water in a 250-milliliter graduate in an amount equivalent to 4 pounds per 100 gallons of water. The product spontaneously and rapidly dispersed throughout the water and was fully dispersed within 25 seconds. A sample of a commercially available product ("Zerlate" marketed by E. I. du Pont de Nemours & Co., Inc.) containing 76% zinc dimethyldithiocarbamate a 24 percent inerts was similarly added to water, but this sample floated on the surface of the water and did not disperse. Separate portions of these products were added to 4-ounce jars and the jars were inverted over rulers and lifted to allow the products to flow out. The product of this invention freely flowed out of the jar to form a pile about 4¼ inches in diameter at the base and was substantially free of large crumps. The "Zerlate," on the other hand, was not free-flowing and formed a pile comprising numerous large clumps and only about 3¼ inches in diameter at the base.

Samples of a 99 percent zinc ethylenebisdithiocarbamate power produced as described in Example XIII and a commercially available 75% zinc ethylenebisdithiocarbamate containing 25% inerts ("Ortho" sold by Chevron Chemical Co.) were separately added to water-filled graduates in the manner just described. Both products dispersed within 25 seconds, but the product of this invention dispersed in the form of fine individual particles which remain in suspension on standing, whereas the "Ortho" brand product dispersed in the form of agglomerates which settled rapidly upon standing.

Employing the procedure described in Example III, except that the filter cake weighed only 157 pounds, 68.75 pounds of kaolin were blended into the slurry formed after addition of the Darvan No. 1 as described in Example XI, and a red dye was added just prior to spray drying, a 50% tetramethylthiuramdisulfide product was produced. Samples of this product and a commercially available 50% tetramethylthiuramdisulfide ("Arasan 50-Red" marketed by Du Pont) were added to water-filled graduates as described above. The product of this invention rapidly and spontaneously dispersed throughout the water, and was essentially completely dispersed within one minute, whereas the Arasan product was not. Furthermore, when the product of this invention was evaluated for dry flowability as described above, a well-distributed pile having a major dimension at its base of about 5 inches and free from large agglomerates was obtained, whereas the Arasan formed a 4-inch diameter pile comprising numerous large agglomerates.

A co-precipiated zinc/manganese ethylene bisdithiocarbamate was prepared by stirring 1 mole of zinc sulfate solution into 10 moles of sodium ethylenebisdithiocarbamate solution while cooling to maintain the temperature at 95° F. Then 9 moles of manganous sulfate solution was added with stirring, and the resulting slurry was filtered and washed. The resulting wet filter cake was processed as described in Example XII to yield a product containing 98.6% of the coprecipitate. Samples of this product and a commercially available coprecipitated product (Dithane M-45" marketed by Rohm & Haas) containing 80 percent of the active coprecipitate (manganese and zinc in an 8-1 ratio) and 20 percent inerts were evaluated for dry flow characteristics as previously described. The product of this invention flowed readily to form a pile having a major dimension of about 5¼ inches at the base and essentially free of large clumps, whereas the Dithane was essentially non-flowing, in that a large portion thereof remained as a clump retaining the shape of the jar.

What is claimed is:

1. A method for producing a wettable and dispersible dry, particulate solid comprising forming a pumpable slurry by admixing a wet, particulate, water-insoluble solid having a solids content of from about 30 to about 55 weight percent, said solids being selected from the class consisting of manganese dimethyldithiocarbamate, zinc ethylene-bis(dithiocarbamate), manganese ethylene-bis(dithiocarbamate), ferric (dimethyldithiocarbamate), tetramethylthiuram disulfide, 1,1,1 - trichloro-2,2-bis(p-chlorophenyl)-ethane, 2-(alpha-acetonylbenzyl) - 4 - hydroxycoumarin, 3,5-dimethyltetrahydro - 1,3,5,2H - thiadiazine-2-thione, zinc salt of 2-pyridinethiol-1-oxide, hexachlorophene, 2,2' - thiobis(4,6 - dichlorophenol), pentachlorophenol, 2,4-dichlorophenoxy acetic acid, 2,4,5-trichlorophenoxyacetic acid, and rotenone, with from about 0.5 to about 5 weight percent, based upon the solids, of a dispersing agent selected from the group consisting of sodium naphthalene sulfonic acid-formaldehyde condensate, potassium naphthalene sulfonic acid-formaldehyde condensate, sodium lignosulfonate, potassium lignosulfonate and calcium lignosulfonate to form a pumpable slurry; thereafter admixing with said pumpable slurry from about 0.05 to about 2 weight percent, based upon the solids, of a wetting agent selected from the group consisting of sodium N-cocoyl-N-methyl-taurate, sodium tetradecyl sulfonate, sodium, octadecenyl sulfonate, sodium lauryl sulfate, sodium myristyl sulfate, sodium dodecylbenzene sulfonate, octylphenol ethoxylate having about 5 ethyleneoxy units, octylphenol ethoxylate having about 8 to about 10 ethyleneoxy units and sodium alkyl phenyl polyether sulfate; and thereafter drying said slurry to form said dry, particulate solid.

2. A method according to claim 1 wherein said dispersing agent is sodium naphthalene sulfonic acid-formaldehyde condensate and said wetting agent is octylphenol ethoxylate having about 8 to about 10 ethyleneoxy groups.

3. A method according to claim 2 in which said particulate water insoluble solid is ferric (dimethyldithiocarbamate).

4. A method according to claim 2 in which said particulate water insoluble solid is tetramethyllithium disulfide.

5. A method according to claim 2 in which said particulate water insoluble solid is co-precitated zinc/manganese ethylene bisdithiocarbamate.

6. A method according to claim 1 wherein drying is effected by spray drying.

References Cited

UNITED STATES PATENTS

| | | | |
|---|---|---|---|
| 2,662,841 | 12/1953 | Fike et al. | 424—286 |
| 2,858,250 | 10/1958 | Geary | 424—187 |
| 3,293,126 | 12/1966 | Person et al. | 424—286 |
| 3,497,598 | 2/1970 | Luginbuhl | 424—287 |

OTHER REFERENCES

McCutcheon, J., "Detergents & Emulsifiers" Annual (1966) p. 209.

Frear, "Pesticide Index," College Science Pub., 1963, p. 214.

Sisley, J. et al., "Encyclopedia of Surface Active Agents," Chem. Pub. Co., 1964, pp. 56, 57.

SAM ROSEN, Primary Examiner

V. D. TURNER, Asistant Examiner

U.S. Cl. X.R.

424—245, 246, 283, 317, 328, 337, 347, 354; 71—DIG 1